United States Patent
Kattainen et al.

(10) Patent No.: US 10,954,101 B2
(45) Date of Patent: Mar. 23, 2021

(54) ELEVATOR BRAKE RELEASE MONITORING

(71) Applicant: Kone Corporation, Helsinki (FI)

(72) Inventors: Ari Kattainen, Helsinki (FI); Lauri Stolt, Helsinki (FI)

(73) Assignee: Kone Corporation, Helsinki (FI)

( * ) Notice: Subject to any disclaimer, the term of this patent is extended or adjusted under 35 U.S.C. 154(b) by 662 days.

(21) Appl. No.: 15/638,899

(22) Filed: Jun. 30, 2017

(65) Prior Publication Data

US 2017/0349403 A1    Dec. 7, 2017

Related U.S. Application Data

(63) Continuation of application No. PCT/FI2016/050065, filed on Feb. 2, 2016.

(30) Foreign Application Priority Data

Feb. 3, 2015    (EP) .................................... 15153686

(51) Int. Cl.
| | |
|---|---|
| *B66B 5/00* | (2006.01) |
| *B66B 1/34* | (2006.01) |
| *B66D 5/14* | (2006.01) |
| *B66D 5/30* | (2006.01) |
| *G01G 19/14* | (2006.01) |

(52) U.S. Cl.
CPC ......... *B66B 5/0025* (2013.01); *B66B 1/3476* (2013.01); *B66B 1/3484* (2013.01); *B66B 5/0031* (2013.01); *B66D 5/14* (2013.01); *B66D 5/30* (2013.01); *G01G 19/14* (2013.01)

(58) Field of Classification Search
USPC ........................................................ 187/288
See application file for complete search history.

(56) References Cited

U.S. PATENT DOCUMENTS

| | | | |
|---|---|---|---|
| 3,610,342 A | 10/1971 | Stainken | |
| 4,928,021 A | 5/1990 | Yonemoto | |
| 4,982,815 A | 1/1991 | Arabori et al. | |
| 7,222,698 B2* | 5/2007 | Hanninen | B66B 5/0093 187/393 |
| 7,350,883 B2* | 4/2008 | Hubbard | B66B 5/0018 187/393 |

(Continued)

FOREIGN PATENT DOCUMENTS

| | | |
|---|---|---|
| GB | 1469576 A | 4/1977 |
| JP | 2008056428 A | 3/2008 |

(Continued)

OTHER PUBLICATIONS

International Search Report PCT/ISA/210 for International Application No. PCT/FI2016/050065 dated May 31, 2016.

(Continued)

*Primary Examiner* — Christopher Uhlir
(74) *Attorney, Agent, or Firm* — Harness, Dickey and Pierce, P.L.C.

(57) ABSTRACT

Brake release sensors for an elevator can be replaced by an arrangement wherein the brake release is determined from the force caused by the brake. This is achieved by providing measuring device for measuring the weight of an elevator car between the brake and the motor body so that the weight of the elevator car is measured only when the brake is on.

10 Claims, 2 Drawing Sheets

(56) References Cited

U.S. PATENT DOCUMENTS

| | | | |
|---|---|---|---|
| 8,104,586 B2* | 1/2012 | Traktovenko | B66B 1/3476 187/277 |
| 8,584,812 B2 | 11/2013 | Dorsch et al. | |
| 2008/0088267 A1 | 4/2008 | Hahn et al. | |
| 2011/0132696 A1 | 6/2011 | Dorsch et al. | |
| 2014/0311257 A1 | 10/2014 | Hubbard et al. | |
| 2015/0068325 A1 | 3/2015 | Mustalahti et al. | |

FOREIGN PATENT DOCUMENTS

| | | |
|---|---|---|
| JP | 2011063372 A | 3/2011 |
| JP | 2011148632 A | 8/2011 |
| JP | 2011195270 A | 10/2011 |
| WO | WO-2013182742 A1 | 12/2013 |

OTHER PUBLICATIONS

Written Opinion of the International Searching Authority PCT/ISA/237 for International Application No. PCT/FI2016/050065 dated My 31, 2016.

European Seacrh Report for European Patent Application No. 15153686 dated Sep. 16, 2015.

\* cited by examiner

ELEVATOR BRAKE RELEASE MONITORING

This application is a continuation of PCT International Application No. PCT/FI2016/050065, which has an International filing date of Feb. 2, 2016, and which claims priority to European Patent Application No. 15153686.9, filed Feb. 3, 2015, the entire contents of both of which are incorporated herein by reference.

FIELD OF THE INVENTION

The invention relates elevators and particularly to braking systems used in elevators.

BACKGROUND OF THE INVENTION

Elevator systems are regulated all over the world. Regulations typically relate to the security of an elevator. Each elevator must fulfill the regulations and these requirements are sometimes verified regularly. Typically elevators are inspected regularly and parts not filling the requirements must be changed. As elevators are typically used for transporting passengers the security is an essential aspect. Thus, all aspects that can have a negative impact on the security should be eliminated. Sometimes a small failure in a part of the elevator may lead into security issues.

One of the important issues is that the elevator is operating without additional forces restricting the movement of the elevator car. One possible cause is a defected brake that is not completely released and causes friction. The problem associated with this is the fact that the brake wears very fast and will not have the required braking power when it is needed. The wearing may be very fast and the dangerous technical condition occurs so that the conventional inspection frequency is not able to notice the wearing in time.

The problem mentioned above is regulated by many authorities and it is also desirable without regulation to prevent the movement of the elevator car when the brake is not completely released so that possibly dangerous situation is avoided.

Conventionally displacement sensors have been used for detecting the release of a brake. These sensors are additional components that are not always reliable because the mechanical movement of a brake is very small. Furthermore, sometimes the brake does not open completely but the sensor indicates that the brake has been opened but it still has a contact which will cause friction and leads into undesired wearing as discussed above. A further drawback of additional sensor is that in general, using additional components causes expenses because of additional components and additional design needed. Thus, there is a need for reliable and cost efficient arrangement for brake release monitoring.

SUMMARY

The invention discloses an arrangement, wherein brake release sensors for an elevator can be replaced by an arrangement wherein the brake release is determined from the force caused by the brake. This is achieved by providing measuring device for measuring the weight of an elevator car between the brake and the motor body so that the weight of the elevator car is measured only when the brake is on.

An example of an elevator where a weight measuring device is arranged between the brake and the motor body is disclosed in WO2013/182742 A1, wherein the measurement device is used for measuring the weight of an elevator car in order provide smooth start for an elevator and, for example, detecting overweight situations. In the embodiment disclosed in the publication mentioned above the weight of an elevator car is measured from a rotating shaft part of traction sheave when the break is on. This is a preferred way of measuring the weight as it will measure the load actually caused to the traction sheave. Because of this arrangement the measurement result should be zero when the brake is released the elevator is operated. However, if the brake is not opened completely and the brake drags, the weighing device will indicate a value that deviates from the value of completely released brake.

An embodiment is implemented as a method for detecting release of a brake of an elevator. In the method a measuring device for measuring weigh of an elevator car from a rotating shaft of part a traction sheave of the elevator when the brake of the elevator is closed is used. Then, when the brake is about to be released a brake release signal is generated. After the brake release signal values a value from the measuring device generating the brake release signal are still received. Received values are compared with a reference value. A brake failure is detected when the received value deviates from the reference value.

In an embodiment the method described above is implemented as a computer program embodied on a computer readable medium. The computer program is configured to cause the method described above when executed in a computing device. In a further embodiment an apparatus is used to cause the method described above. In a further embodiment the above described method, computer program or apparatus is implemented in an elevator.

The benefit of the invention is that it provides a reliable way of replacing conventional switches for detecting the brake release. Furthermore, as the arrangement suggested by the present invention is more accurate it will fulfill the increased requirements by different regulations around the world. A further benefit of the present invention is that it provides cost savings compared to traditional switches by providing reliable brake monitoring by weighing device of the elevator. Thus, no additional components are needed, which causes cost savings in manufacturing and maintenance.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 1:
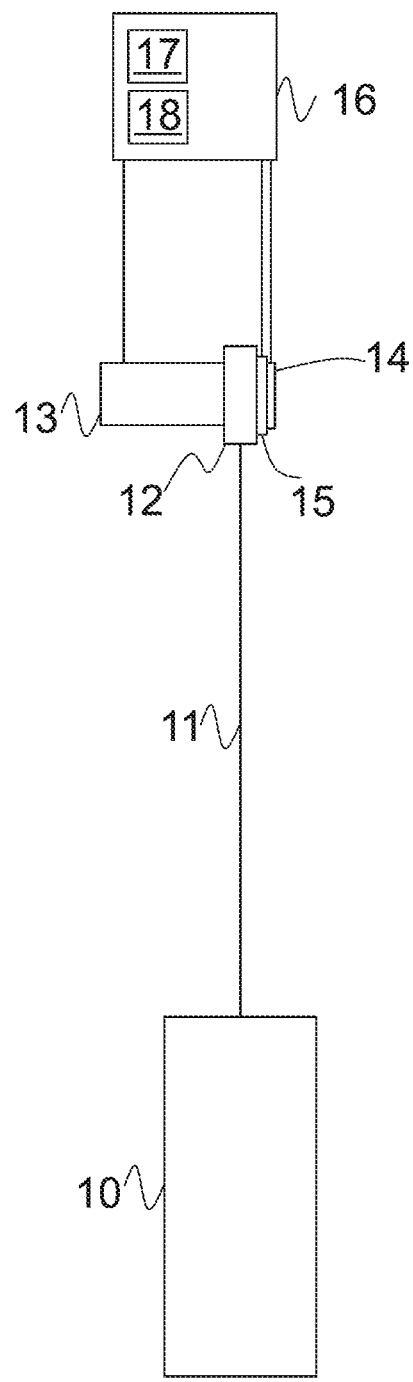
FIG. 1 is a block diagram of an example embodiment of the present invention.

In FIG. 1 a block diagram of an arrangement according to the present invention. In the embodiment of FIG. 1 an elevator car 10 is operated by using a hoisting rope 11 which is arranged to a traction sheave 12, which is operated by the hoisting machine 13. The elevator car 10 transports passengers according to given calls. The hoisting machine of the embodiment is controlled by a controller 16 that is connected to the hoisting machine 13. For example, when the controller receives a call, directly or indirectly, from the elevator car, it will instruct the hoisting machine to move the elevator to the called floor. When the elevator is not moving it will be kept in its position by a break 14. The break is typically magnetic so that an electromagnetic force is used to keep the brake released during the movement of the elevator car. When the elevator car stops the brake closes when the electromagnetic force is turned off. In the embodiment of figure a weighing device 15 is arranged between the brake 14 and traction sheave 12 so that the weighing device 15 is able to measure the weight of the elevator car when the brake 14 is in closed position. The present invention is not limited to any brake or hoisting machine type but any hoisting machine and brake type can be used, provided that they can be configured in a manner that the weight of the elevator car is measured only when the brake is in closed position. Examples of suitable brake, measuring device and hoisting machine are given, for example, in WO2013/182742 A1 mentioned above.

In the embodiment according to FIG. 1 hoisting machine 13, weighing device 15 and brake 14 are connected to the controller 16. In the figure a separate connection between each of the components is disclosed, however, it is possible that the arrangement comprises a further controller at the vicinity of the hoisting machine or hoisting arrangement and the information is then transmitted further to the controller. Conventionally the weighing device 15 has been used for providing a smooth start for elevator ride by estimating the force needed from the weight of the elevator car. A further use has been to detect possible overload situations when the elevator car is too heavy. When the elevator is overloaded the operation of the elevator should be prevented for security reasons. In other words, conventionally the weighing device has been used between the rides when the elevator car is stationary in a floor waiting for a next call or having a stop in a floor when the elevator rides have been called to a plurality of destinations.

When the arrangement of FIG. 1 is operated the controller 16 receives calls and schedules the movement of the elevator car 10. During the operation it may receive indications from and can send instructions to the elevator car 10, hoisting machine 13, brake 14 and weighing device 15. According to the embodiment of FIG. 1 the release of the brake 14 can be detected using, for example, a method discussed below with regard FIG. 2. In the method the controller 16 detects or receives an indication that the brake release signal has been generated and/or the elevator is moving. At the same time it will continue receiving data from weighing device 15. When the brake 14 and weighing device 15 are configured as discussed above, there should not be any load to be measured if the brake 14 is released completely. If the weighing device, however, indicates a value different to the value without load it might be an indication of a brake failure. The different value is caused by dragging brake.

The controller 16 further includes at least one processor 17 and at least one memory 18 for storing and executing computer programs and related data. Furthermore, the controller 16 may include other components that are not shown in the figure, for example, data communications connection if the controller is located at a remote site so that the data can be received and instructions transmitted through this data communication connection.

Figure 2:
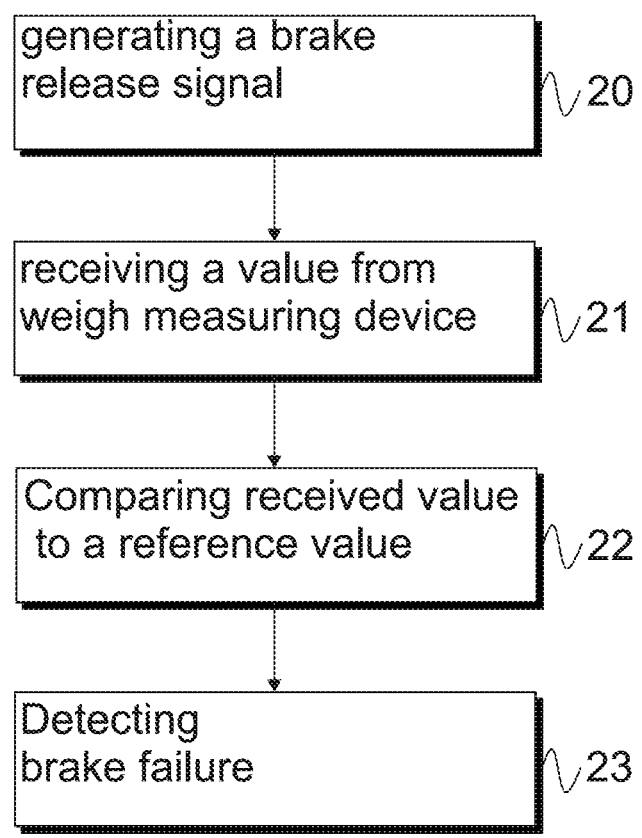
FIG. 2 is a flow chart of a method according to the present invention.

In FIG. 2 a method according to the present invention is disclosed. The method is initiated by generating brake release signal, step 20. For example, if the controller 16 of FIG. 1 is responsible for monitoring and instructing the operation of the elevator system, the brake release signal may be an internal message within the software framework operating the elevator. Thus, when the software component responsible for instructing brake release sends an instruction for brake release it simultaneously sends message to monitoring component that the brake has been released. As a response to the brake release signal the brake is released, or if the brake is defect, at least tried to release.

The monitoring component receives values from the weight measuring device, step 21. When the brake is in closed position the monitoring means receive the weight of the elevator car. When the brake is released the value received should be zero if the weighing device is calibrated to show zero when there is no load. The received value is compared to a reference value, step 22. It is important to understand that the weighing device does not necessarily show zero when there is no load but may deviate from zero. This offset value may be determined by monitoring the values that the weighing device provides and if it is the same value to both elevator operating directions the value can be considered as an offset from zero and used as a reference value. If the measured value deviates from this reference value, there may be a brake problem and it is detected, step 24. Correspondingly, if the reference value cannot be determined, i.e., the weighing device shows different values to different directions, there may be a brake problem.

After detecting the brake problem different actions may be taken. For example, the elevator may be brought to the next floor and stopped there. The operation of that elevator may be prevented and a maintenance call may be launched.

The above mentioned method may be implemented as computer software which is executed in a computing device, such as the controller 16 of FIG. 1. When the software is executed in a computing device it is configured to perform the above described inventive method. The software is embodied on a computer readable medium so that it can be provided to the computing device, such as the controller 16 of FIG. 1.

As stated above, the components of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, a RAM, a PROM, an EPROM, a FLASH-EPROM, any other suitable memory chip or cartridge, or any other suitable medium from which a computer can read.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:
1. A method of detecting a failure of a release of a brake of an elevator, which method comprises:
monitoring, via a measuring device, a reference weight of an elevator car from a traction sheave of the elevator while the elevator car is driven in an unloaded state in different operating directions;
determining whether the reference weight of the elevator car is same while the elevator car is driven in the different operating directions;
storing the reference weight of the elevator car as a reference value, in response to the reference weight of the elevator car being same while the elevator car is driven in the different operating directions;
instructing the brake of the elevator to open;
measuring, via the measuring device, a weight of the elevator car from the traction sheave of the elevator after instructing the brake of the elevator to open;
comparing the weight to the reference value; and
detecting the failure of the release of the brake of the elevator based on a variation between the weight of the elevator car and the reference value.

2. The method according to claim 1, further comprising: transmitting an error message in response to detecting the failure of the brake of the elevator.

3. The method according to claim 1, further comprising: moving said elevator to a next floor in response to detecting the failure of the brake of the elevator.

4. The method according to claim 1, further comprising: preventing use of said elevator in response to detecting the failure of the brake of the elevator.

5. A non-transitory computer readable medium storing a computer program that, when executed, configures a computing device to,
monitor, via a measuring device, a reference weight of an elevator car from a traction sheave of an elevator while the elevator car is driven in an unloaded state in different operating directions;
determine whether the reference weight of the elevator car is same while the elevator car is driven in the different operating directions;
store the reference weight of the elevator car as a reference value, in response to the reference weight of the elevator car being same while the elevator car is driven in the different operating directions;
instruct a brake of the elevator to open;
measure, via the measuring device, a weight of the elevator car from the traction sheave of the elevator after instructing the brake of the elevator to open;
compare the weight to the reference value; and
detect a failure of a release of the brake of the elevator based on a variation between the weight of the elevator car and the reference value.

6. An apparatus comprising:
at least one memory; and
a processor configured to detecting a failure of a release of a brake of an elevator by,
monitoring, via a measuring device, a reference weight of an elevator car from a traction sheave of the elevator while the elevator car is driven in an unloaded state in different operating directions,
determining whether the reference weight of the elevator car is same while the elevator car is driven in the different operating directions,
storing the reference weight of the elevator car as a reference value, in response to the reference weight of the elevator car being same while the elevator car is driven in the different operating directions,
instructing the brake of the elevator to open,
measuring, via the measuring device, a weight of the elevator car from the traction sheave of the elevator after instructing the brake of the elevator to open,
comparing the weight to the reference value, and
detecting the failure of the release of the brake of the elevator based on a variation between the weight of the elevator car and the reference value.

7. An elevator system comprising:
at least one elevator including the apparatus according to claim 6; and
the measuring device.

8. The method of claim 1, further comprising:
reading the reference value from a non-volatile memory.

9. The non-transitory computer readable medium of claim 5, wherein the computer program, when executed, further configures the computing device to read the reference value from a non-volatile memory.

10. The apparatus of claim 6, wherein the processor is further configured to read the reference value from a non-volatile memory.

* * * * *